(12) United States Patent
Ikeno

(10) Patent No.: US 6,559,917 B2
(45) Date of Patent: May 6, 2003

(54) PATTERN FORMATION METHOD USING REFLOW ENHANCEMENT LAYER AND METHOD FOR MANUFACTURING REFLECTIVE TYPE LIQUID CRYSTAL DISPLAY DEVICE USING THE SAME

(75) Inventor: Hidenori Ikeno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/987,088

(22) Filed: Nov. 13, 2001

(65) Prior Publication Data
US 2002/0057414 A1 May 16, 2002

(30) Foreign Application Priority Data
Nov. 16, 2000 (JP) .......................................... 2000-349935

(51) Int. Cl.⁷ ............................................. G02F 1/1335
(52) U.S. Cl. ........................................ 349/113; 349/187
(58) Field of Search ................................. 349/138, 187, 349/113

(56) References Cited

FOREIGN PATENT DOCUMENTS

JP 2000-171794 6/2000

*Primary Examiner*—Robert H. Kim
*Assistant Examiner*—Timothy L Rude
(74) *Attorney, Agent, or Firm*—Sughrue Mion, PLLC

(57) ABSTRACT

Openings each having various opening area are formed in a photosensitive organic film by one-time exposure. A polyvinyl alcohol (PVA) film for increasing the thermal fluidity of the photosensitive organic film is coated on the photosensitive organic film, followed by a heat treatment to flow the polyvinyl alcohol film and the photosensitive organic film. After the heat treatment, the openings each having a small area are closed and smooth ruggedness of a surface of the photosensitive organic film results, and further the polyvinyl alcohol film is removed. Accordingly, a reflective electrode formed on the photosensitive organic film has ruggedness having a small average angle of inclination in its surface layer, and becomes thereby an ideal reflective electrode.

11 Claims, 6 Drawing Sheets

PATTERN FORMATION METHOD USING REFLOW ENHANCEMENT LAYER AND METHOD FOR MANUFACTURING REFLECTIVE TYPE LIQUID CRYSTAL DISPLAY DEVICE USING THE SAME

BACKGROUND OF THE INVENTION

1. Field of the Invention

The present invention relates to a reflective type liquid crystal display device, and more particularly, to a pattern formation method for forming an underlying insulating film and simplification of manufacturing process of a reflective electrode with ruggedness on its surface by utilizing the pattern formation method.

2. Description of the Prior Art

Japanese Published Unexamined Patent Application No. Hei 2000-171794 discloses a technology for simplifying the manufacturing process of a reflective type liquid crystal display device having configuration that a reflective electrode is disposed on the side of a liquid crystal in which an underlying pattern for forming the ruggedness of a reflective electrode and a contact hole pattern are formed simultaneously by one-time exposure by using a monolayer positive photosensitive resin.

FIG. 1 is a plan view of a conventional reflective type liquid crystal display device having the same type of TFT substrate as that of the reflective type liquid crystal display device described in the foregoing publication when viewing the TFT substrate from the side of the liquid crystal. FIG. 2 is a cross sectional view when the TFT substrate, the liquid crystal, and a CF (Color Filter) substrate are cut along a plane through a cut line A–A' of FIG. 1 and orthogonal to the TFT substrate.

The configuration of the reflective type liquid crystal display device will be described below in accordance with the manufacturing process of the reflective type liquid crystal display device.

First, on a first substrate 1 made of materials such as glass, a first bus wiring 2 also serving as a gate electrode 22 is formed, and subsequently, a first insulating film 3 also serving as a gate insulating film is formed. On the first insulating film 3, a semiconductor region 4 constituting an active layer of TFT is formed, being located above the gate electrode 22. Furthermore, on the first insulating film 3, a second bus wiring 5 connected to one end of the semiconductor region 4 and a drain electrode 25 connected to the other end of the semiconductor region 4 are formed.

Then, a protective insulating film 6 is formed on the first insulating film 3 so as to cover the second bus wiring 5 and the drain electrode 25. A part of the protective insulating film 6 is removed to form an opening 7 for ensuring connection to the drain electrode 25.

Subsequently, aluminum is deposited on the protective insulating film 6 and patterned to form a reflective electrode 8 in a region excluding the first bus wiring 2, the second bus wiring 5, and a TFT region, thereby forming a TFT substrate 100. In this case, although the reflective electrode 8 does not cover the TFT region, the reflective electrode 8 may cover the TFT region.

Then, on one surface of a second substrate 31 made of materials such as glass, color filters 41, 42, and 43 are formed so as to face the reflective electrode 8 of the TFT substrate 20. Subsequently, a transparent electrode 44 is formed so as to cover the color filter 41. Finally, on the opposite surface of the second substrate 31, a polarizer 46 is formed, thereby forming a CF substrate 40.

Thus obtained TFT substrate 20 and CF substrate 40 are processed in the following manner. That is, the uppermost surface on the TFT side of the TFT substrate 20 and the uppermost surface on the color filter side of the CF substrate 40 are printed with an alignment layer material by using offset printing method or the like, thereby completing the formation of the TFT substrate 20 and the CF substrate 40.

Finally, the respective alignment layer materials of the TFT substrate 20 and the CF substrate 40 are subjected to a rubbing process to form alignment layers 9. Then, a cell gap material (not shown) is interposed between the two substrates so that the two substrates are disposed so as to have a predetermined space from each other followed by the injection of a liquid crystal 10 into the space.

Japanese Published Unexamined Patent Application No. Hei 2000-171794 described above has its feature in the method for manufacturing the underlying pattern formed under the reflective electrode 8, in which the reflective electrode 8 on the side of the TFT substrate 20 is formed in rugged shape. Therefore, a description will be performed focusing on the manufacturing process of the underlying pattern. FIGS. 3A to 3C and FIGS. 4A to 4C are cross sectional views of the TFT substrate in the manufacturing process, taken along a cut line B–B' of FIG. 1.

First, the gate electrode 22 and the first bus wiring 2, the first insulating film 3, the semiconductor region 4, and the second bus wiring 5 and the drain electrode 25 are successively formed on the first substrate 1. Thereafter, on the first insulating film 3 on which the second bus wiring 5 and the drain electrode 25 have been formed, a positive photosensitive resin 81 is coated (FIG. 3A). Then, the photosensitive resin 81 is exposed at a low illuminance by using a photomask 75 in which light-shielding portions 85 have been patterned (FIG. 3B). Subsequently, the photosensitive resin 81 is further exposed at a high illuminance by using a photomask 76 having a different pattern from that of the photomask 75, in which light-shielding portions 86 have been patterned (FIG. 3C). Thereafter, upon development of the photosensitive resin 81, an opening 82 and concave portions 83 are formed in the photosensitive resin 81 (FIG. 4A).

Then, the photosensitive resin 81 thus formed is heated, so that the photosensitive resin 81 undergoes thermal fluidity and is changed into a deformed resin 91. Furthermore, the opening 82 and the concave portions 83 are changed into a contact hole 7 having a smaller opening area than that of the opening 82 and concave portions 93 each having a smoother angle than that of each concave portion 83, respectively (FIG. 4B).

Then, on the deformed resin 91 in which the contact hole 7 has been formed, aluminum is deposited and patterned so that aluminum is left in the region excluding the first bus wiring 2, the second bus wiring 5, and the TFT region, thereby forming the reflective electrode 8 and the TFT substrate 20 (FIG. 4C) Thereafter, the manufacturing steps in accordance with the manufacturing method already described are performed to complete a reflective type liquid crystal display device.

However, in the method for manufacturing a reflective electrode shown in FIGS. 3A to 3C and FIGS. 4A to 4C, the concave portions 83 are formed in the photosensitive resin 81 by exposure. The exposure condition at this step is critical, that is, the tolerance of the amount of light exposure, which is allowed to ensure the minimum thickness of the photosensitive resin film after development thereof is small. Therefore, there arises a problem that the film thickness of the photosensitive resin at the concave portions 83 is not uniform. Furthermore, an exposure process having a long process time has to be performed twice, thereby elongating the overall manufacturing process period.

SUMMARY OF THE INVENTION

It is an object of the present invention to provide a method for manufacturing a reflective type liquid crystal display device having an underlying film on which a reflective electrode is easily formed followed by the capability of providing good reflection characteristics.

A pattern formation method of the present invention includes, as its basic construction, the steps of:

forming an organic insulating film on a substrate, and opening predetermined regions of said organic insulating film to form first openings and second openings in the organic insulating film, the first openings being formed for forming contact holes in the organic insulating film, and the second openings each being a smaller opening area than that of each of the first openings and opened to a depth located at least below a surface of the organic insulating film within a thickness of the organic insulating film;

forming a resin film on the organic insulating film covering the first openings and the second openings;

causing flow of the organic insulating film and the resin film to form a deformed organic insulating film resulting from the flow of the organic insulating film and change the first openings to third openings each having smaller opening area than that of each of the first openings, the second openings being covered by the deformed organic insulating film; and selectively removing only the resin film. The pattern formation method of the present invention adopts the following various preferred embodiments.

First, the resin film is a film acting so as to increase thermal fluidity of the organic insulating film by covering the organic insulating film.

Furthermore, the resin film is a water-soluble film, more concretely, one of polyvinyl alcohol and water-soluble photocurable resin.

Additionally, the flow of the organic insulating film and the resin film are caused by heating the organic insulating film and the resin film at a temperature ranging from 130° C. to 250° C.

A first method for manufacturing a reflective type liquid crystal display device of the present invention comprising the steps of:

an underlying film formation step for forming an underlying film having first ruggedness of a surface of a first substrate; and a reflective electrode forming step for forming a reflective electrode on the underlying film, in which the underlying film formation step includes:
a step for forming an underlying film having first ruggedness having a large angle of inclination;
a step for forming a modifying film on the underlying film for improving thermal fluidity of a surface layer of the underlying film;
a step for changing the first ruggedness into a second ruggedness having an angle of inclination smaller than that of the first ruggedness by heating the underlying film with the modifying film thereon; and
a step for removing selectively the modifying film.

A second method for manufacturing a reflective type liquid crystal display device of the present invention has a construction in which a step for forming an underlying film for a reflective member includes:

a step for coating a first organic insulating film on a surface of a first substrate on the side of a liquid crystal;

a step for exposing and developing the first organic insulating film to form a plurality of ruggedness of a surface of the first organic insulating film;

a step for forming a second organic insulating film on the plurality of ruggedness, the second organic insulating film having a feature of dissolving in a solvent different from a solvent the organic insulating film dissolves in;

a step for heating the plurality of ruggedness of the surface of the first organic insulating film and changing the plurality of ruggedness into a plurality of ruggedness of the surface of the first organic insulating film having an inclination smoother than that of the plurality of the ruggedness; and a step for selectively removing only the second organic insulating film.

A third method for manufacturing a reflective type liquid crystal display device of the present invention includes:

a step for forming a plurality of first bus wirings on a first substrate, forming an interlayer insulating film on the first substrate covering the first bus wirings, and forming a plurality of second bus wirings crossing over the first bus wirings on the interlayer insulating film;

a step for forming a protective film having an opening in predetermined area therein on the interlayer insulating film covering the second bus wirings;

a step for forming a reflective electrode connected to an electrode of a thin film transistor simultaneously formed together with the second wirings via the opening;

a step for covering the reflective electrode with an alignment layer;

a step for forming a transparent electrode on a second substrate;

a step for covering the transparent electrode with an alignment layer; and a step for disposing the first and second substrates so as to face the alignment layers of the first and second substrates face each other, and interpose a liquid crystal between the first and second substrates, in which the step for forming the protective film having the opening in predetermined area therein on the interlayer insulating film covering the second bus wirings includes:

a step for forming an organic insulating film on the interlayer insulating film covering the second bus wirings, opening the organic insulating film so as to form first openings on a part of an electrode for a thin film transistor exposing the part of the electrode and second openings in an area of the organic insulating film excluding the first openings, each having an opening area smaller than that of each of the first openings and a depth located at least below a surface of the organic insulating film within a thickness of the organic insulating film;

a step for forming a resin film on the organic insulating film covering the first openings and the second openings;

a step for making the organic insulating film and the resin film flow to change the organic insulating film into a deformed organic insulating film, at the same time changing the first openings into third openings each having an opening area smaller than that of each of the first openings and exposing the surface of the electrode of the thin film transistor, the deformed organic insulating film having a surface having an angle of inclination smaller than that of each of the second openings and covering the second openings;

a step for selectively removing only the resin film; and a step for forming a light reflective film on the deformed organic insulating film covering the third openings, followed by patterning of the light reflective film to form a reflective electrode, in which the step for covering the interlayer insulating film with the protective film having the openings in predetermined regions covering the second bus wirings includes an only one-time exposure step using a photomask, and the only one-time exposure step is used in the step for forming the first and second openings.

DETAILED DESCRIPTION OF THE PREFERRED EMBODIMENTS

A method for manufacturing a reflective type liquid crystal display device of an embodiment of the present invention will be described with reference to FIGS. 5A to 5C, FIGS. 6A to 6C, and FIG. 2. In the present invention, explanation will be performed focusing on area of a reflective electrode on the TFT substrate side, the area being defined along the cut line B–B' in a plan view of FIG. 1.

Figure 1:
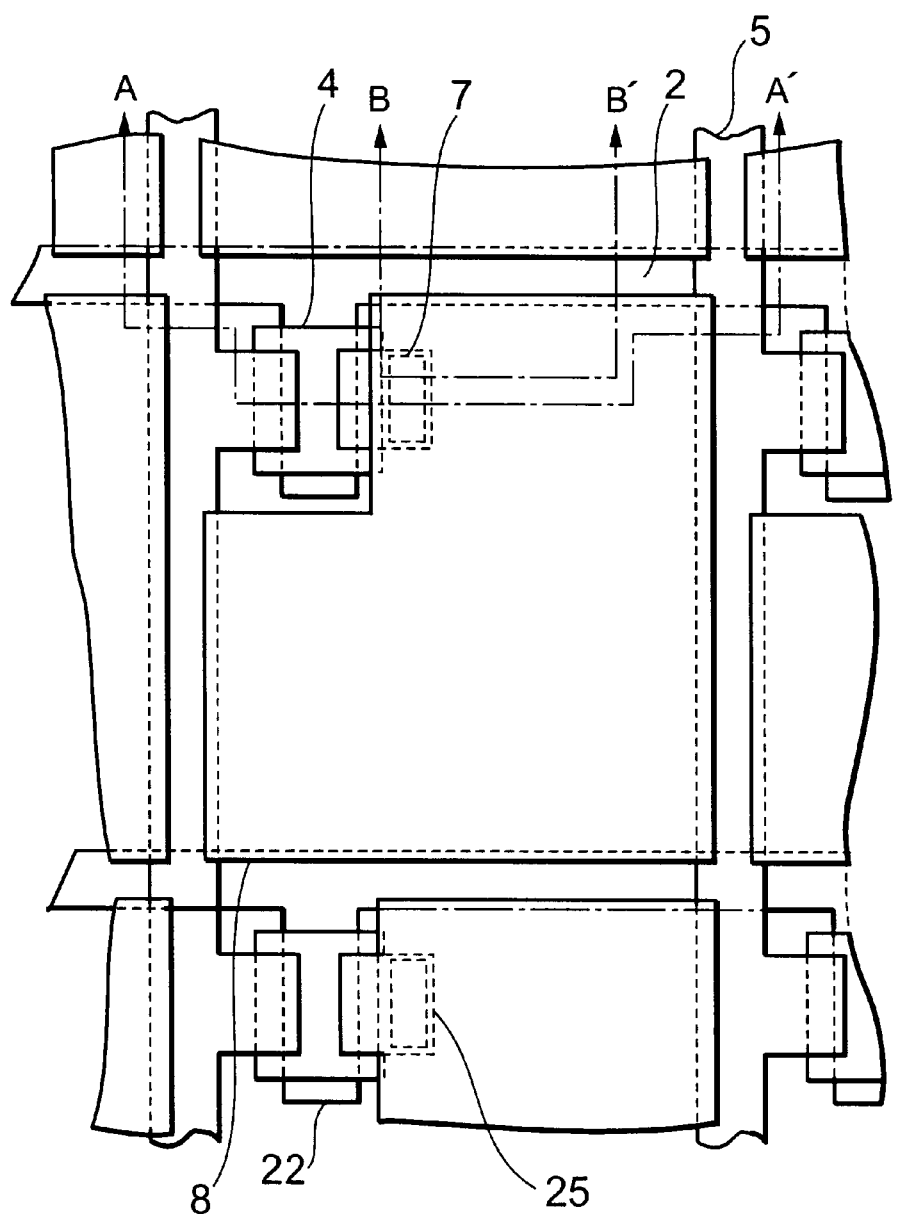
FIG. 1 is a plan view of a conventional reflective type liquid crystal display device.
Figure 5A:
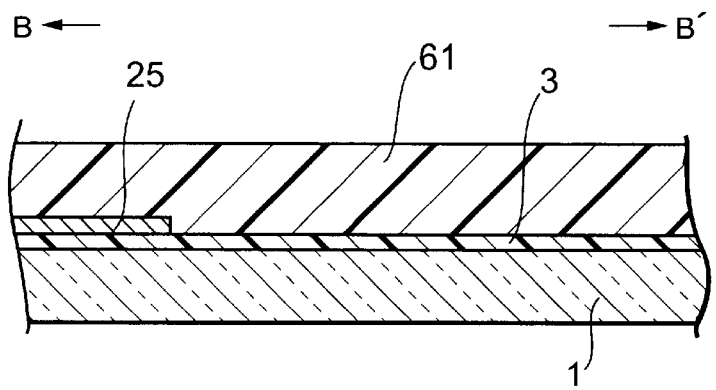
FIGS. 5A to 5C are cross sectional views showing a method for manufacturing a reflective type liquid crystal display device of an example of the present invention in manufacturing order.

First, as shown in FIGS. 1 and 5A, following the method for manufacturing the conventional reflective type liquid crystal display device, on a first substrate 1 made of an insulating material such as glass, a gate electrode 22 and a first bus wiring 2, a first insulating film 3, a semiconductor region 4, and a second bus wiring 5 and a drain electrode 25 are successively formed.

Subsequently, a photosensitive organic film 61 serving as a protective insulating film is coated to a thickness of about 3.0 $\mu$m by a spin coating method on the first insulating film 3 so as to cover the second bus wiring 5 and the drain electrode 25.

Figure 5B:
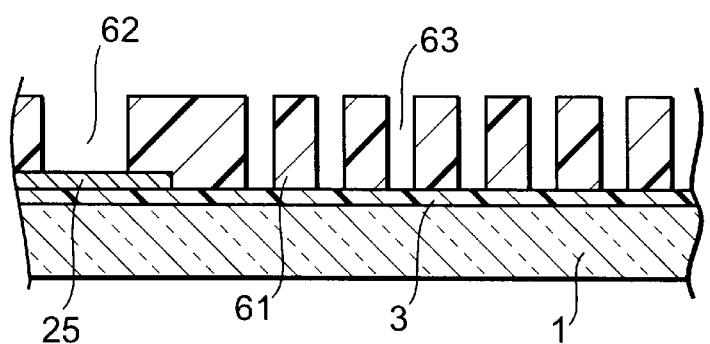

Thereafter, as shown in FIG. 5B, the positive photosensitive organic film 61 is selectively exposed to light by using a photomask, and then developed. As a result, a first opening 62 with a width of about 10 $\mu$m, and a large number of second openings 63 comprised of irregularly arranged circular or polygonal openings having the largest opening width of 4.0 $\mu$m are formed in the photosensitive organic film 61. In this step, the space between the first opening 62 and the second openings 63, and the space between the second openings 63 are formed to be 2.0 to 8.0 $\mu$m (desirably 3.0 $\mu$m to 5.0 $\mu$m). In addition, the maximum widths of the second openings 63 may be either the same or different. Furthermore, the sidewall of the photosensitive organic film 61 is substantially vertical to the surface of the underlying first insulating film 3, or the surface of the drain electrode 25, that is, formed having large angle with respect to those surfaces.

Figure 4A:
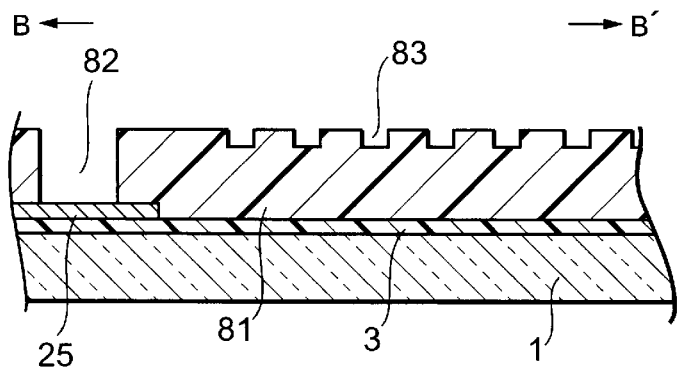
FIGS. 4A to 4C are cross sectional views showing the manufacturing steps subsequent to the step of FIG. 3C.
Figure 4B:
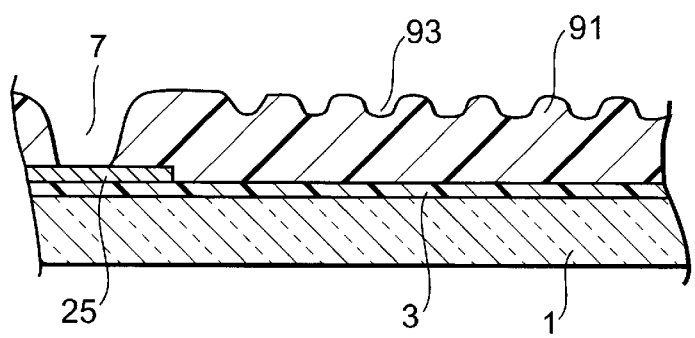
Figure 4C:
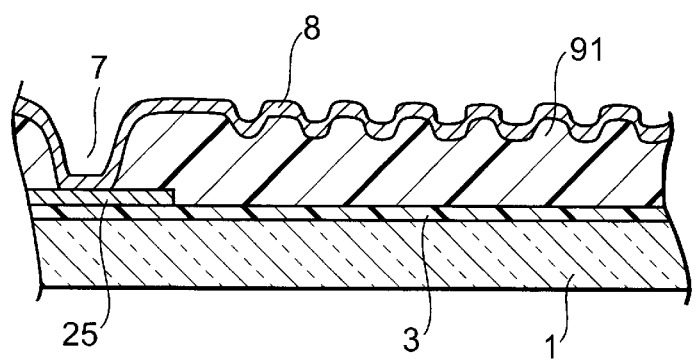

It should be noted that although the embodiment described above shows an example where the second openings 63 are formed penetrating the photosensitive organic film 61 in a film thickness direction, the embodiment is not limited to this example and employ the following structure. That is, only the first opening 62 is formed penetrating the photosensitive organic film 61 in a film thickness direction, and the second openings 63 are opened to a depth located at least below a surface of the organic insulating film within a thickness of the photosensitive organic film 61, which is a construction similar to that shown in FIG. 4B.

Figure 5C:
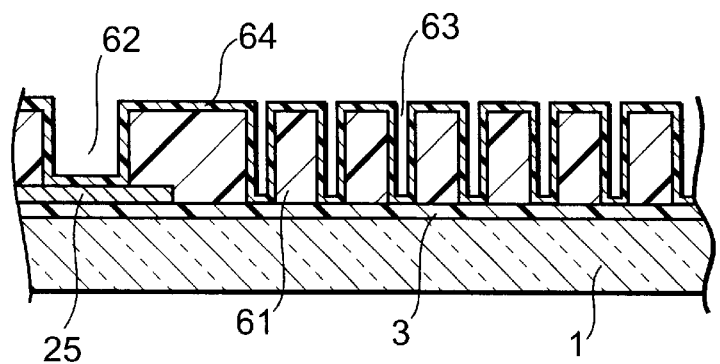

Subsequently, as shown in FIG. 5C, the photosensitive organic film 61 in which the first opening 62 and the second openings 63 have been formed is dried in an oven at 100° C. for 1 hour. Then, a polymeric polyvinyl alcohol (hereinafter, abbreviated as PVA) film 64 is coated as a modifying film to a thickness of 0.5 to 2.0 $\mu$m by a spin coating method on the photosensitive organic film 61.

Figure 6A:
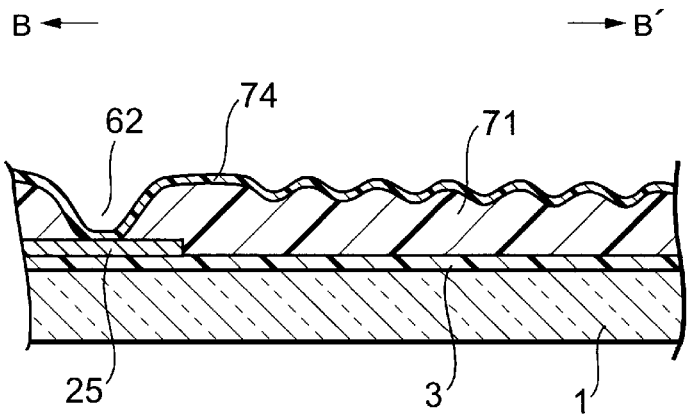
FIGS. 6A to 6C are cross sectional views showing the manufacturing steps subsequent to the step of FIG. 5C.

After that, as shown in FIG. 6A, the first substrate 1 on which the photosensitive organic film 61 and the PVA film 64 have been formed is placed in an oven at 200° C. for 1 hour for heat treatment, and the photosensitive organic film 61 and the PVA film 64 flow, and change into a deformed organic film 71 and a deformed PVA film 74, respectively. Note that if the temperature of the oven falls within a range of from 130 to 250° C., it is possible to optimize the shape of the deformed PVA film 74 by various changing and adjusting the temperature and the heat treatment time. Referring now to the reason for the oven temperature range, 130 to 250° C., if the temperature is less than 130° C., the photosensitive organic film does not flow. If it exceeds 250° C., "scorching" of the photosensitive organic film occurs. That is, the polymer constituting the photosensitive organic film is decomposed, so that the color of the film, which has been colorless, is changed into dark brown, resulting in the useless material as the underlying film of the reflective electrode.

In this step, the PVA film 64 plays a role in increasing the fluidity of the photosensitive organic film 61 caused by heat treatment. Therefore, the opening width, which has been about 10 $\mu$m prior to the heat treatment, of the first opening 62 formed in the photosensitive organic film 61 is reduced to around 5.0 $\mu$m, but the first opening 62 is never be closed. On the other hand, into respective second openings 63, the photosensitive organic film around the openings flow, thereby completely covering the surface of the first insulating film 3 and forming the ruggedness at the surface ruggedness of the photosensitive organic film in the area where the second openings 63 were formed.

Figure 6B:
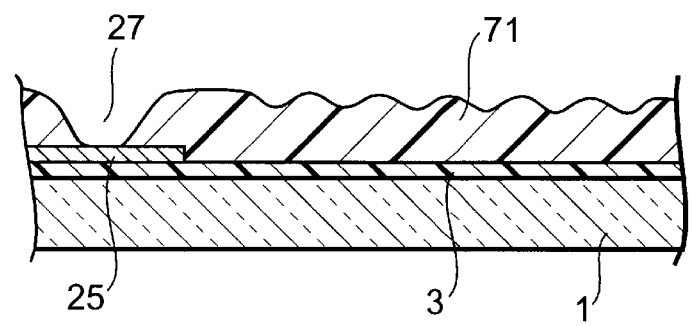

Thereafter, as shown in FIG. 6B, the first substrate 1 is rinsed with water while being applied with an ultrasonic wave for about 10 minutes to selectively remove only the deformed PVA film 74. The deformed PVA film 74 is removed from the first substrate 1 by the ultrasonic rinse with water to form a deformed organic film 71 having a contact hole 27 as a third opening having an opening width of about 5.0 μm and ruggedness 73 of the surface. Note that the photosensitive organic film 61 dissolves, for instance, in a solvent such as diethyl glycol methyl ethyl ether or N-methyl-2-pyrrolidone (NMP), but does not dissolve in pure water. Furthermore, the sidewalls of the deformed organic film 71 formed in the contact hole 27 and the ruggedness 73 of the deformed organic film 71 are smooth with respect to the surface of the underlying first insulating film 3, or the surface of the drain electrode 25, in other words, formed having the smaller angle with respect to the surface of the underlying first insulating film 3 than those of the deformed organic film before the heat treatment. Particularly, the average angle of the ruggedness 73, which is the value obtained by averaging the overall angles thereof, is reduced.

Figure 6C:
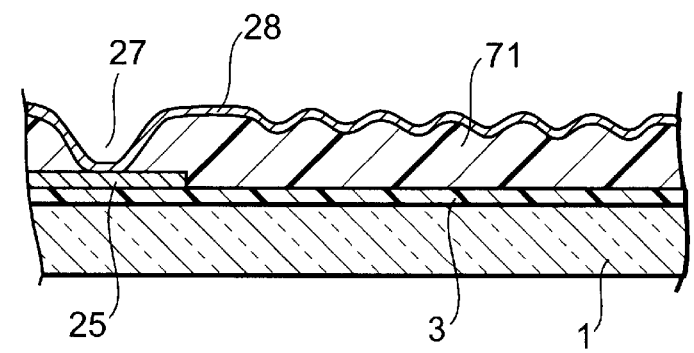

Subsequently, as shown in FIG. 6C, on the deformed organic film 71 in which the contact hole 27 has been formed, aluminum is deposited to a thickness of about 0.3 μm as a reflection film by a sputtering method. Then, the aluminum is patterned so as to remove at least the aluminum above the first bus wiring 2 and the second bus wiring 5, thereby forming a reflective electrode 28.

Thereafter, the same manufacturing process as that of the conventional reflective type liquid crystal display device follows.

Figure 2:
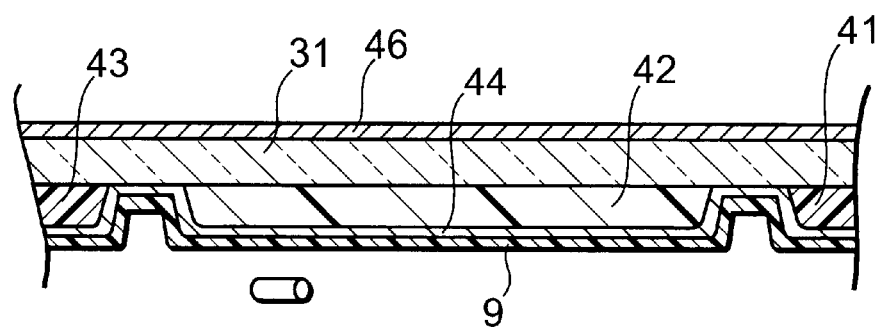
FIG. 2 is a cross sectional view of the conventional reflective type liquid crystal display device.
Figure 2:
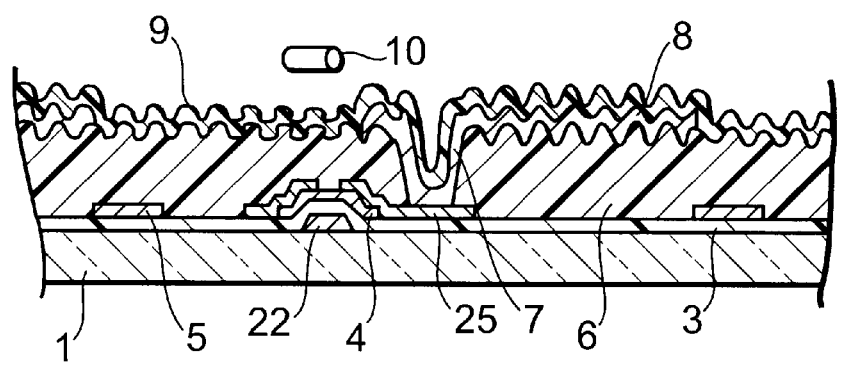
Figure 3A:
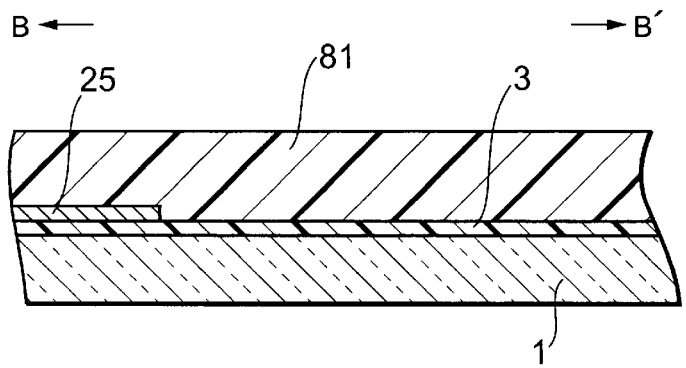
FIGS. 3A to 3C are cross sectional views showing the method for manufacturing the conventional reflective type liquid crystal display device in manufacturing order.
Figure 3B:
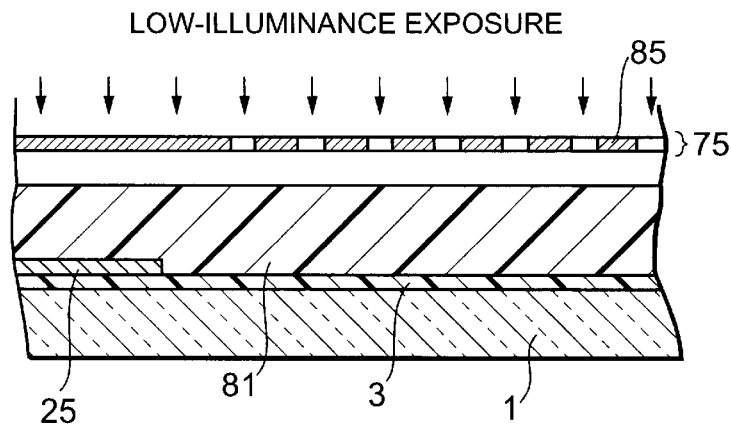
Figure 3C:
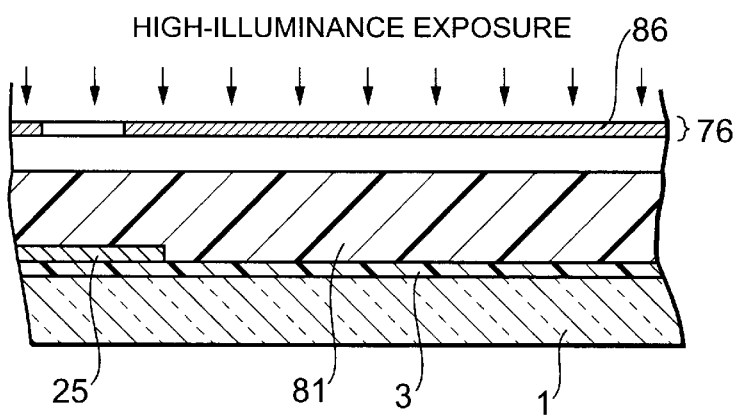

That is, as shown in FIG. 2, after preparing a second substrate 31 made of insulating materials such as glass color filters 41, 42, and 43 are formed thereon facing a reflective electrode 8 of a TFT substrate 20. Subsequently, a transparent electrode 44 is formed covering the color filters 41, 42, and 43. Finally, on the opposite side of the second substrate 31, a polarizer 46 is formed and as a result, a CF substrate 40 is obtained.

Although the embodiment employs an example in which the color filters are formed on the second substrate 31, another example in which the color filters are not formed on the CF substrate 40 but on the TFT substrate may be employed as a modified example of the embodiment.

On each of the uppermost layer surfaces of respective substrates of the TFT substrate 20 and the CF substrate 40 thus obtained, an alignment film material is coated by using an offset printing method or the like.

Thereafter, the respective alignment film materials of the TFT substrate 20 and the CF substrate 40 are subjected to a rubbing process to form alignment films 9. Then, a cell gap material is interposed therebetween so that the two substrates are disposed so as to have a predetermined space from each other. Finally, a liquid crystal 10 is injected into the space between the TFT substrate 20 and the CF substrate 40.

Thus, the reflective type liquid crystal display device of the present invention is completed.

In the foregoing embodiment, although polyvinyl alcohol is used as a modifying film, any materials, for example, water-soluble photocurable resin, capable of increasing the thermal fluidity of a photosensitive organic film and having water solubility may be employed.

Furthermore, in the foregoing embodiment, although the photosensitive organic film 61 is thickly coated in a thickness of 3 μm, the thickness of a photosensitive organic film is not limited to the above-stated value. That is, since it is an object of the present invention to coat a polymeric film (modifying film) on a photosensitive organic film for improving the thermal fluidity of the photosensitive organic film 61, regardless of the film thickness of the photosensitive organic film 61, as far as the organic film is capable to have thermal fluidity as a result of the modifying film being coated thereon, such organic film can be employed in the present invention.

As described above, according to the manufacturing method of the reflective type liquid crystal display device of this embodiment, it is possible to form a photosensitive organic film having smooth surface by employing the following process: first, form openings having various opening areas in the photosensitive organic film coated on the substrate by one-time exposure; and coat a modifying film for increasing the thermal fluidity of the photosensitive organic film thereon; and then, heat the above-described films; and finally, selectively remove the modifying film, whereby the openings required for connecting upper wiring and lower wiring is ensured to have opening area needed for the interconnection therebetween, and the small openings are closed to have smooth surface. Therefore, the reflective electrode formed on the photosensitive organic film formed has a rugged surface inclined in a small average angle with respect to the substrate surface, and is able to serve as an ideal reflective electrode.

What is claimed is:

1. A pattern formation method comprising the steps of:
    forming an organic insulating film on a substrate; opening predetermined regions of said organic insulating film to form first openings and second openings in said organic insulating film, said first openings being formed for forming contact holes in said organic insulating film such that each of said second openings has a smaller opening area than that of each of said first openings and is opened to a depth located at least below a surface of said organic insulating film within a thickness of said organic insulating film;
    forming a resin film on said organic insulating film covering said first openings and said second openings;
    causing flow of said organic insulating film and said resin film to form a deformed organic insulating film resulting from said flow of said organic insulating film such that said first openings are changed to third openings each having smaller opening area than that of each of said first openings, and said second openings are covered by said deformed organic insulating film; and
    selectively removing only said resin film.

2. The pattern formation method according to claim 1, where in said resin film is a film acting so as to increase thermal fluidity of said organic insulating film by covering said organic insulating film.

3. The pattern formation method according to claim 1, wherein said resin film dissolves in a solvent different from a solvent capable of dissolving said organic insulating film.

4. The pattern formation method according to claim 1, wherein said resin film is a water-soluble film.

5. The pattern formation method according to claim 1, wherein said resin film is one of polyvinyl alcohol and water soluble photocurable resin.

6. The pattern formation method according to claim 1, wherein said flow of said organic insulating film and said resin film are caused by heating said organic insulating film and said resin film at a temperature ranging from 130° C. to 250° C.

7. A method for manufacturing a reflective type liquid crystal display device, comprising the steps of:
    an underlying film formation step for forming an underlying film having first ruggedness of a surface of a first substrate;

a modifying film formation step for forming a modifying film on said underlying film for improving thermal fluidity of a surface layer of said underlying film;

a heating step for heating said underlying film having said modifying film thereon, and thereby changing said first ruggedness of said underlying film into second ruggedness having an angle of inclination smaller than said angle of inclination of said first ruggedness; and a removal step of modifying film for selectively removing only said modifying film.

8. The method for manufacturing a reflective type liquid crystal display device according to claim 7, further comprising: after said removal step, a reflective electrode forming step for forming a reflective electrode on said underlying film;

a second substrate forming step for forming a transparent electrode on one side of a second substrate and forming a polarizer on the other side thereof; and a liquid crystal panel forming step for disposing said first substrate and said second substrate so as to make said reflective electrode and said transparent electrode face each other and interpose a liquid layer between said first substrate and said second substrate.

9. The method for manufacturing a reflective type liquid crystal display device according to claim 7, wherein said underlying film formation step is carried out by coating a first organic insulating film on said surface of said first substrate, and exposing and developing said first organic insulating film to form a plurality of ruggedness of a surface of said first organic insulating film;

said modifying film formation step is carried out by forming a second organic insulating film on said plurality of ruggedness, said second organic insulating film having a feature of dissolving in a solvent different from a solvent said organic insulating film dissolves in;

said heating step is carried out by heating said plurality of ruggedness of said surface of said first organic insulating film and changing said plurality of ruggedness into a plurality of ruggedness of said surface of said first organic insulating film having an inclination smoother than that of said plurality of said ruggedness; and said removal step of modifying film is carried out by removing said second organic insulating film.

10. The method for manufacturing a reflective type liquid crystal display device according to claim 8, further comprising: before the underlying film formation step, a step for forming a plurality of first bus wirings on said first substrate, forming an interlayer insulating film on said first substrate so as to cover said first bus wirings, and forming a plurality of second bus wirings crossing over said first bus wirings on said interlayer insulating film, wherein said underlying film formation step includes a step for forming an organic insulating film on said interlayer insulating film covering said second bus wirings, opening said organic insulating film so as to form first openings on a part of an electrode for a thin film transistor exposing said part of said electrode and second openings in an area of said organic insulating film excluding said first openings, each having an opening area smaller than that of each of said first openings and a depth located at least below a surface of said organic insulating film within a thickness of said organic insulating film;

said modifying film formation step includes a step for forming a resin film on said organic insulating film covering said first openings and said second openings;

said heating step includes a step for making said organic insulating film and said resin film flow to change said organic insulating film into a deformed organic insulating film covering said second openings, at the same time changing said first openings into third openings each having an opening area exposing said surface of said electrode of said thin film transistor, said deformed organic insulating film having a surface having an angle of inclination smaller than that of each of said second openings formed before said heating step;

said removal step of modifying film includes a step for selectively removing only said resin film;

said reflective electrode forming step includes a step for forming a light reflective film on said deformed organic insulating film covering said third openings, followed by patterning of said light reflective film to form a reflective electrode;

said reflective electrode forming step is followed by a step for covering said reflective electrode with an alignment layer;

said second substrate forming step includes a step for forming a transparent electrode on said second substrate and a step for covering said transparent electrode with an alignment layer; and said second substrate forming step is followed by a liquid crystal panel forming step for disposing said first and second substrates so as to face said alignment layers of said first and second substrates each other interposing a liquid crystal therebetween.

11. The method for manufacturing a reflective type liquid crystal display device according to claim 10, wherein said step for covering said interlayer insulating film with said organic insulating film having openings in predetermined regions covering said second bus wirings, included in said underlying film formation step, includes an only one-time exposure step using a photomask, and said only one-time exposure step is used in said step for forming said first and second openings.

* * * * *